United States Patent [19]

Haselgrove

[11] Patent Number: 5,417,358
[45] Date of Patent: May 23, 1995

[54] PULL DOWN UTILITY ROOF RACK

[76] Inventor: Michael B. Haselgrove, 42 Scholfield Ave., Port Colborne, Ontario, Canada, L3K5S9

[21] Appl. No.: 134,755

[22] Filed: Oct. 12, 1993

[51] Int. Cl.$^6$ ............................................. B60R 9/042
[52] U.S. Cl. .................................... 224/310; 224/315
[58] Field of Search ............... 224/309, 310, 315, 320, 224/321, 329, 330, 42.42, 42.44; 414/462; 248/420; 211/94, 94.5, 96; 40/592

[56] References Cited

U.S. PATENT DOCUMENTS

| | | | |
|---|---|---|---|
| 3,193,124 | 7/1965 | Essling | 224/310 |
| 3,460,694 | 8/1969 | Simms | 414/462 |
| 3,963,136 | 6/1976 | Spanke | 224/310 |
| 4,269,339 | 5/1981 | Bott | 224/309 |
| 4,446,998 | 5/1984 | Taig | 224/310 |
| 4,667,428 | 5/1987 | Elmer | 40/592 |
| 4,682,719 | 7/1987 | Ernst et al. | 224/310 |
| 4,826,387 | 5/1989 | Audet | 224/310 |
| 4,948,024 | 8/1990 | Warner et al. | 224/310 |
| 4,997,118 | 3/1991 | Uebach et al. | 224/315 |
| 5,037,153 | 8/1991 | Stark | 224/281 |
| 5,076,530 | 12/1991 | Dove et al. | 248/420 |
| 5,348,207 | 9/1994 | Frank | 224/310 |

FOREIGN PATENT DOCUMENTS

| | | | |
|---|---|---|---|
| 101054 | 2/1984 | European Pat. Off. | 224/310 |
| 2501601 | 9/1982 | France | 224/310 |
| 2596344 | 10/1987 | France | 224/310 |
| 2673404 | 9/1992 | France | 224/310 |

*Primary Examiner*—Henry J. Recla
*Assistant Examiner*—Gregory Vidovich

[57] ABSTRACT

A pull down roof rack comprising a pair of parallel fixed rails secured to the roof of a vehicle, the fixed rails including a front fixed rail and a rear fixed rail, the rails adapted to extend from side to side of the vehicle each with a slot in its upper surface with rollers rotatable therein, and with their upper surfaces extending above the upper surfaces of the rail, each rail having lateral projections constituting bearing surfaces; two pair of movable rails slidable supported in pairs on the fixed rails and movable in pairs between a storage position where the movable rails are totally overlying the fixed rails and a loading position wherein the movable rails are slid outwardly from the center of the fixed rails, each movable rail having an upper surface, downwardly extending side surfaces and inwardly extending bearing surfaces located above and below the lateral projections of the fixed rails; and one pair of cross rails coupling each pair of movable rails, each pair of cross rails including a laterally exterior cross rail and a laterally interior cross rail.

4 Claims, 4 Drawing Sheets

PULL DOWN UTILITY ROOF RACK

BACKGROUND OF THE INVENTION

1. Field of the Invention

The present invention relates to pull down utility roof rack and more particularly pertains to a roof rack which may be pulled down from the vehicle for easy loading.

2. Description of the Prior Art

The use of vehicle roof racks is known in the prior art. More specifically, roof racks heretofore devised and utilized for the purpose of transporting articles are known to consist basically of familiar, expected and obvious structural configurations, notwithstanding the myriad of designs encompassed by the crowded prior art which have been developed for the fulfillment of countless objectives and requirements.

The prior art discloses various types of roof racks for the transportation of articles on vehicles. Note U.S. Pat. No. 4,630,990 to Whiting wherein adjustability and removability is provided for a roof rack. A series of patents including U.S. Pat. Nos. 4,948,024 to Warner; 4,134,509 to Clement and 4,024,971 to Rohrer all disclose roof racks wherein movement thereof is effected by forward and rearward movement with respect to the vehicle. Lastly, lateral motion of a roof rack is disclosed in U.S. Pat. No. 4,887,750 to Dainty. According to that disclosure, however, straps in clamps associated with the sides of the vehicle are utilized with convenience being relatively limited as compared with the simplicity and reliability of the present invention.

In this respect, the roof rack according to the present invention substantially departs from the conventional concepts and designs of the prior art, and in so doing provides an apparatus primarily developed for the purpose of facilitating loading and unloading.

Therefore, it can be appreciated that there exists a continuing need for a new and improved roof rack which can be moved from the roof of a vehicle for easy loading and unloading. In this regard, the present invention substantially fulfills this need.

SUMMARY OF THE INVENTION

In view of the foregoing disadvantages inherent in the known types of roof racks now present in the prior art, the present invention provides an improved pull down utility roof rack construction wherein the same can be utilized. As such, the general purpose of the present invention, which will be described subsequently in greater detail, is to provide a new and improved pull down utility roof rack apparatus and method which has all the advantages of the prior art and none of the disadvantages.

To attain this, the present invention essentially comprises a pull down roof rack of a heavy duty construction comprising, in combination a pair of parallel fixed rails secured to the roof of a vehicle of the type having a front, rear and sides, the fixed rails including a front fixed rail positionable forwards to the front of a vehicle and a rear fixed rail positionable towards the rear of a vehicle, the rails adapted to extend from side to side of the vehicle each with a slot in its upper surface with rollers rotatable therein with the upper surfaces extending above the upper surfaces of the rail, each rail having lateral projections adjacent to a side of the vehicle and constituting bearing surfaces; two pair of movable rails slidably supported over the fixed rails with each pair overlying the fixed rails and movable in pairs between a storage position where the movable rails are totally overlying the fixed rails and a loading position wherein the movable rails are slid outwardly from the center of the fixed rails, each movable rail having an upper surface, downwardly extending side surfaces and inwardly extending bearing surfaces located above and below the lateral projections of the fixed rails; one pair of cross rails coupling each pair of movable rails, each pair of cross rails including a laterally exterior cross rail locatable adjacent to a side of the vehicle and an end of the fixed rails and a laterally interior cross rail locateable adjacent to the center of the vehicle and fixed rails; locking components positioned within each exterior cross rail to retain the removable rails and cross rails in a position over the fixed rails, the locking components including a pin spring urged into a recess in the fixed rails and a handle coupled with respect thereto, the handle rotatable to engage and disengage the pin; a stop guide pin secured to each laterally exterior end of each fixed rail with an associated engageable stop guide member secured to each laterally interior end of each movable rail whereby a movable rail is fully extended away from the center of the fixed rails, the stop guide member will engage the stop guide pin to allow the pivoting down of the movable rails and cross rails for coupling and uncoupling articles thereto.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved pull down utility roof rack which has all the advantages of the prior art roof racks and none of the disadvantages.

It is another object of the present invention to provide a new and improved pull down utility roof rack which may be easily and efficiently manufactured and marketed.

It is a further object of the present invention to provide a new and improved pull down utility roof rack which is of a durable and reliable construction.

An even further object of the present invention is to provide a new and improved pull down utility roof rack which is susceptible of a low cost of manufacture with regard to both materials and labor, and which accordingly is then susceptible of low prices of sale to the consuming public, thereby making such roof racks economically available to the buying public.

Still yet another object of the present invention is to provide a new and improved pull down utility roof rack which provides in the apparatuses and methods of the prior art some of the advantages thereof, while simultaneously overcoming some of the disadvantages normally associated therewith.

Still another object of the present invention is to facilitate the loading and unloading of articles from a roof rack.

Yet another object of the present invention is to slide and pivot a roof rack from its position on a vehicle to ease loading and unloading.

Even still another object of the present invention is to provide a new and improved pull down roof rack comprising a pair of parallel fixed rails secured to the roof of a vehicle, the fixed rails including a front fixed rail and a rear fixed rail, the rails adapted to extend from side to side of the vehicle each with a slot in its upper surface with rollers rotatable therein, and with their upper surfaces extending above the upper surfaces of the rail, each rail having lateral projections constituting bearing surfaces; two pair of movable rails slidable supported in pairs on the fixed rails and movable in pairs between a storage position where the movable rails are totally overlying the fixed rails and a loading position wherein the movable rails are slid outwardly from the center of the fixed rails, each movable rail having an upper surface, downwardly extending side surfaces and inwardly extending bearing surfaces located above and below the lateral projections of the fixed rails; and one pair of cross rails coupling each pair of movable rails, each pair of cross rails including a laterally exterior cross rail and a laterally interior cross rail.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
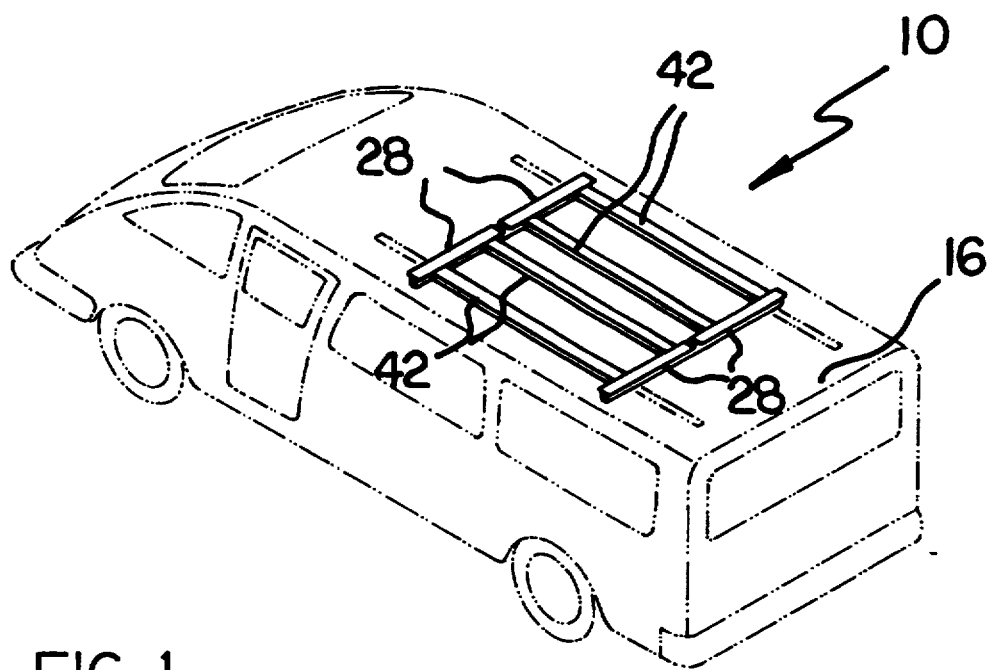
FIG. 1 is a perspective view of the pull down utility roof rack constructed in accordance with the present invention shown on a vehicle illustrated in phantom line.

With reference now to the drawings, and in particular to FIG. 1 thereof, a new and improved pull down utility roof rack embodying the principles and concepts of the present invention and generally designated by the reference numeral 10 will be described.

Figure 2:
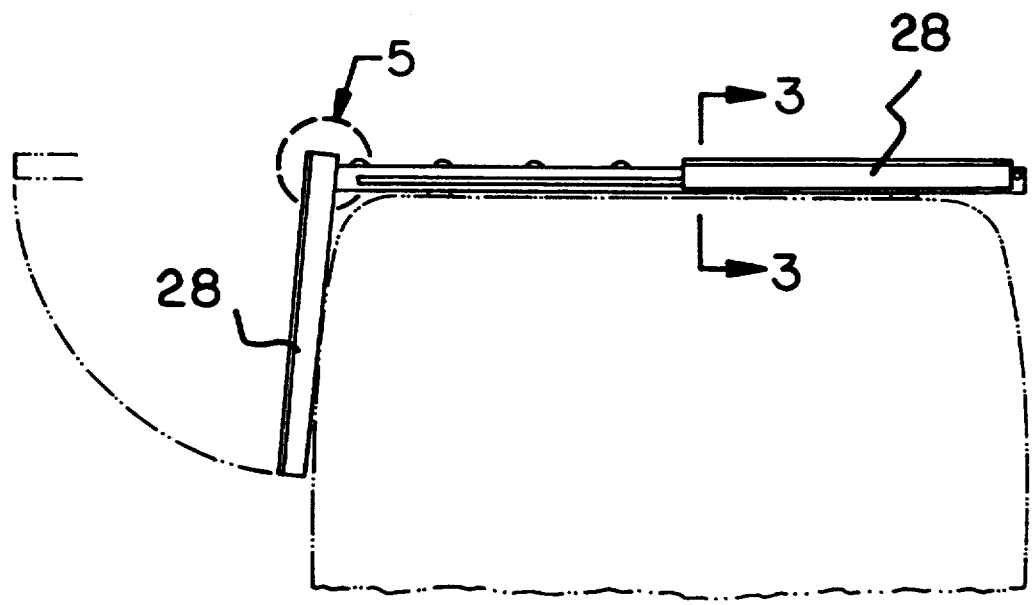
FIG. 2 is an end view of a portion the roof rack and the vehicle of FIG. 1 illustrating one of the rack components in a extended and pivoted position.
Figure 3:
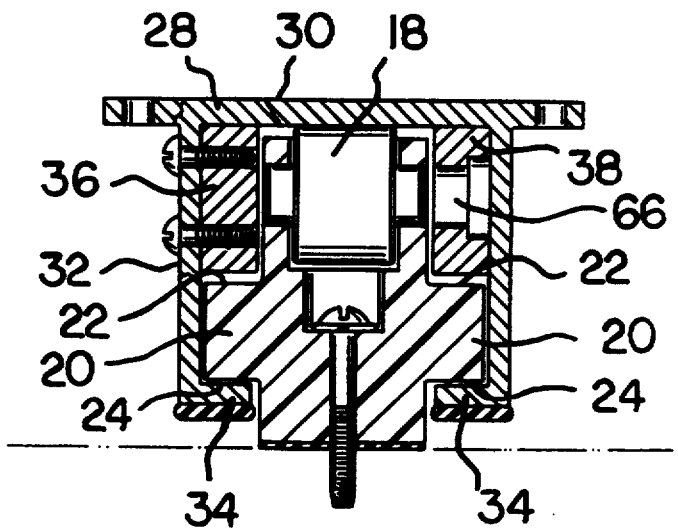
FIG. 3 is a sectional view of the apparatus shown in FIGS. 1 and 2 taken along line 3—3 of FIG. 2.
Figure 4:
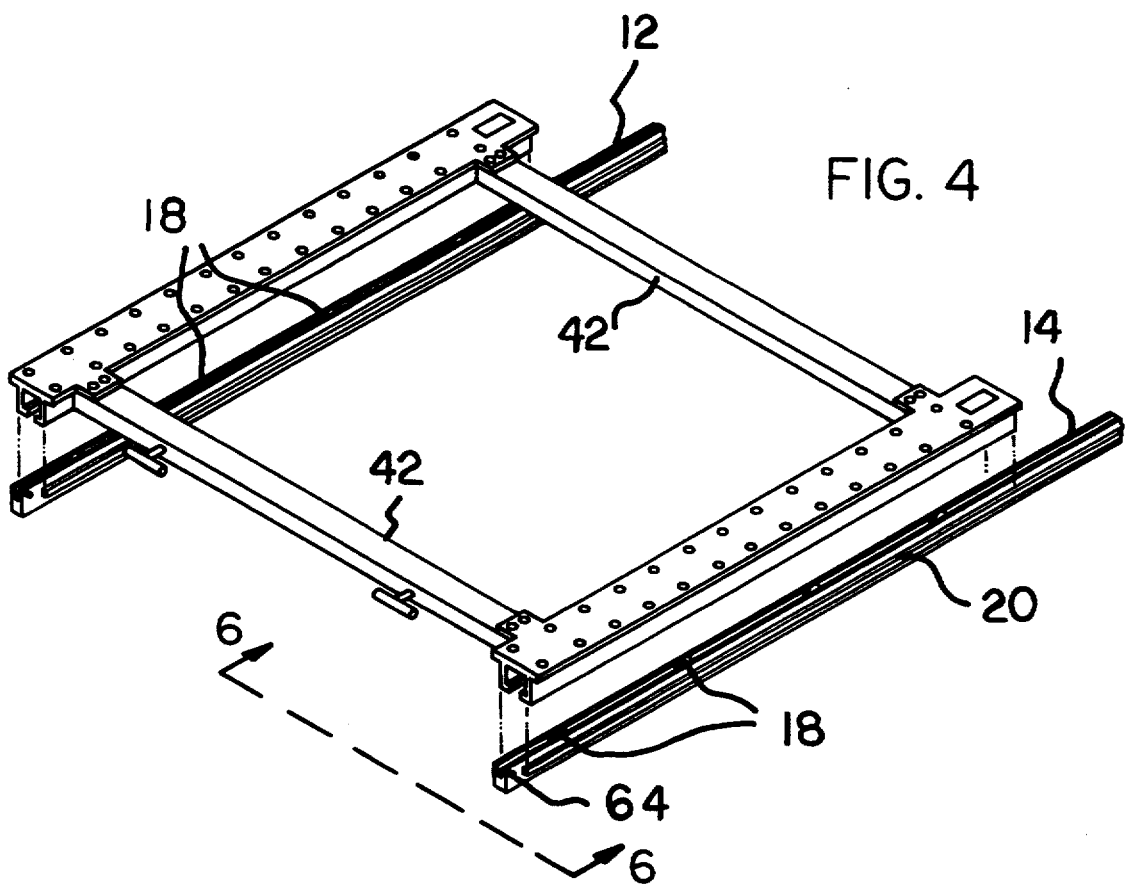
FIG. 4 is an exploded perspective view of one of the rack assemblies.
Figure 5:
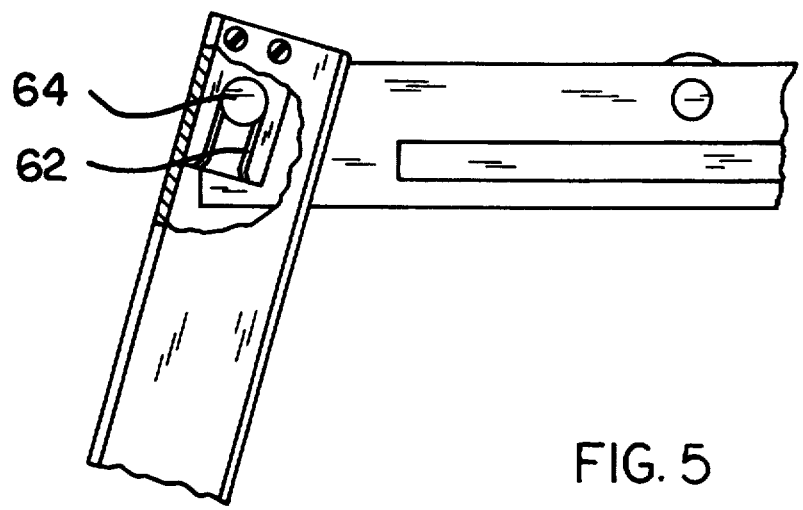
FIG. 5 is an enlarged elevational view taken at section 5 of FIG. 2 with parts broken away to show certain internal constructions thereof.
Figure 6:
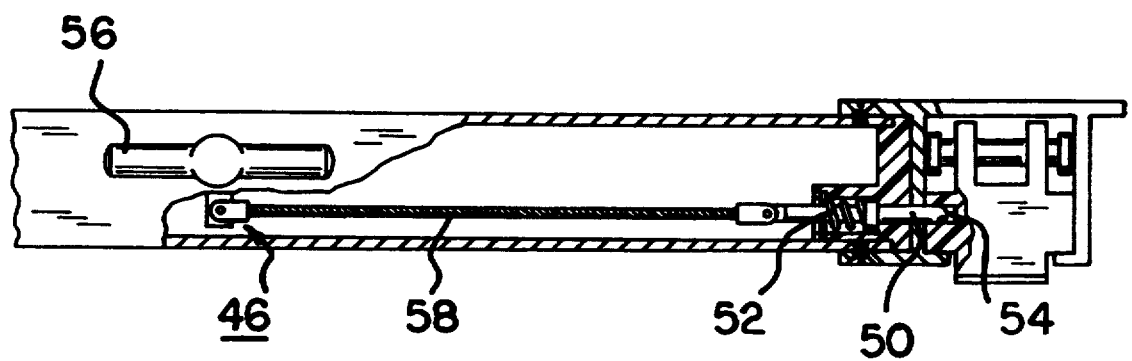
FIG. 6 is a sectional view taken along line 6—6 of FIG. 4.
Figure 7:
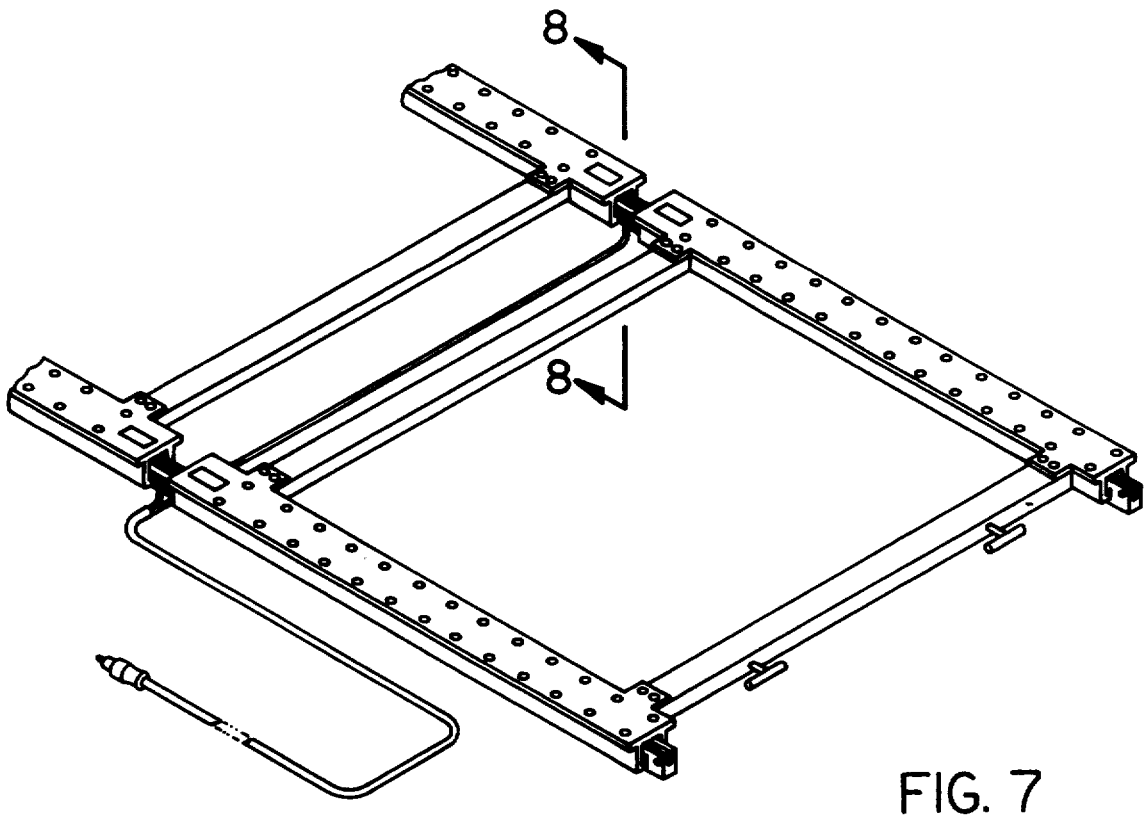
FIG. 7 is a perspective illustration showing an alternate embodiment of the invention.
Figure 8:
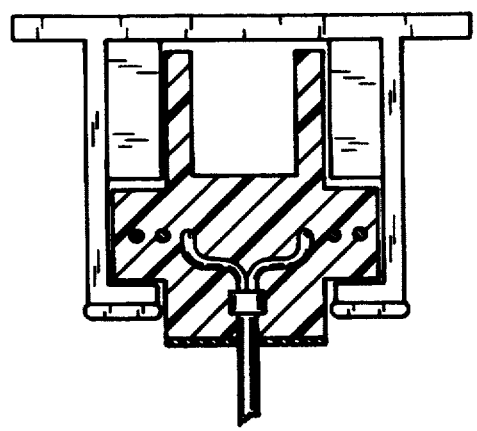
FIG. 8 is a sectional view taken along line 8—8 of FIG. 7.

More specifically, it will be noted that the pull down roof rack 10 is shown in FIG. 1. It is of a heavy duty construction and comprises, in combination, a pair of parallel fixed rails 12 and 14 secured to the roof of a vehicle 16 of the type having a front, rear and sides. The fixed rails including a front fixed rail 12 positioned adjacent to the front of the vehicle. A rear fixed rail 14 is positioned adjacent to the rear of the vehicle. The fixed rails are adapted to be positioned and extend from side to side of the vehicle with their outermost end extending beyond the vehicle end. Note FIG. 2. Each fixed rail 12 and 14 is formed with a slot 16 in its upper surface. Rollers 18 are rotatable supported within slot 16 with the upper surfaces of the rollers extending above the upper surfaces of the rail. Each rail also has lateral projections 20 extending outwardly from both sides of the fixed rails for constituting upper and lower bearing surfaces 22 and 24.

Two pair of movable rails 28 are slidable supported in pairs on the fixed rails 12 and 14. Each pair of the moveable rails are movable in pairs between a storage position where the movable rails are totally overlying the fixed rails, note FIG. 1, and a loading position wherein the movable rails are slid outwardly from the center of the fixed rails, note FIG. 2.

Each movable rail has an upper surface 30, downwardly extending side surfaces 32 and inwardly extending bearing surfaces 34. Additional bearing blocks 36 and 38 are secured to the interiors of the side surfaces. The bearing surfaces and bearing blocks are located above and below the lateral projections 20 of the fixed rails for effecting sliding movement therebetween.

One pair of cross rails 42 couple each pair of movable rails 28. Each pair of cross rails 42 including a laterally exterior cross rail located adjacent to the side of the vehicle and a laterally interior cross rail located adjacent to the center of the fixed rails.

Locking components 46 are positioned within each exterior cross rail 42. The locking components function to retain the movable rails 28 and cross rails 42 in a position over the fixed rails 12 and 14. The locking components include a pin 50 urged by a spring 52 into a recess 54 in an adjacent fixed rail 12 and 14. A handle 56 couples to the pin through a cable 58. The handle 56 is rotatable in the crossrail 42 to engage and disengage the pin for locking and unlocking.

The last functioning components are a stop guide member 62 and a stop guide pin 64. There are four stop guidepins secured to the laterally exterior ends of each fixed rail. An engageable stop guide member for each movable rail is secured to the laterally interior end of each movable rail. An aperture 66 in one bearing block 38 allows movement of the rail with respect to the fixed rail and its stop guide pin 64 when the movable rails are fully extended away from the center of the fixed rails, the stop guide member 62 will engage its associated stop guide pin 64 to allow the pivoting down of the movable rails and their associated cross rails for coupling and uncoupling articles thereto.

A pull down roof rack of a heavy duty construction comprising, in combination a pair of parallel fixed rails secured to the roof of a vehicle of the type having a front, rear and sides, the fixed rails including a front fixed rail positionable adjacent to the front of a vehicle and a rear fixed rail positionable adjacent to the rear of a vehicle, the rails adapted to extend from side to side of the vehicle each with a slot in its upper surface with rollers rotatable therein with the upper surfaces extending above the upper surfaces of the rail, each rail having lateral projections constituting bearing surfaces;

two pairs of movable rails slidably supported in pairs in the fixed rails and movable in pairs between a storage position where the movable rails are totally overlying the fixed rails and a loading position wherein the movable rails are slid outwardly from the center of the fixed rails, each movable rail having an upper surface, downwardly extending side surfaces and inwardly extending bearing surfaces located above and below the lateral projections of the fixed rails; one pair of cross rails coupling each pair of removable rails, each pair of cross rails including a laterally exterior cross rail locateable adjacent to the side of the vehicle and a laterally interior cross rail locateable adjacent to the center of the fixed rails; locking components positioned within each exterior cross rail to retain the removable rails and cross rails in a position over the fixed rails, the locking components including a pens spring urged into a recess in the fixed rails and a handle coupled with respect thereto, the handle rotatable to engage and disengage the pin; a stop guide pen secured to the laterally exterior end of each fixed rail with an engageable stop guide member secured to the laterally interior end of each movable rail whereby when the removable rails are fully extended away from the center of the fixed rails, the stop guide member will engage the stop guide pen to allow the piloting down of the movable rails and cross rails for coupling and uncoupling articles thereto.

The roof rack further includes electrical resistance components located in the fixed rail to raise the temperature thereof during operation and use and an electrical cord and plug positionable in the cigarette lighter of the vehicle for energizing the electrical resistance means.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A pull down roof rack of a heavy duty construction comprising, in combination:
   a pair of parallel fixed rails adapted to be secured to a roof of a vehicle of the type having a front, rear and sides, the fixed rails including a front fixed rail positionable towards the front of the vehicle and a rear fixed rail positionable towards the rear of the vehicle, the fixed rails adapted to extend from side to side of the vehicle, each of the fixed rails having a slot formed in an upper surface of the rails with rollers rotatable therein with the upper peripheral surfaces of the rollers extending above the upper surfaces of the rail, each rail having sides, opposing ends adapted to extend over the sides of the vehicle and laterally extending projections on each side thereof constituting bearing surfaces;
   two pair of movable rails wherein one pair of said moveable rails are slidably supported to respective fixed rails on one side of said vehicle and the other pair of said moveable rails are slidably supported to respective fixed rails on the other side of said vehicle, said moveable rails overlying the fixed rails and movable in said pairs between a storage position wherein the movable rails are totally overlying the fixed rails and a loading position wherein the movable rails are slid outwardly and then pivoted downwardly from the center of the roof, each movable rail having an upper surface, downwardly extending interior and exterior side surfaces and inwardly extending bearing surfaces connected to said side surfaces located above and below the lateral projections of the fixed rails;
   two pair of cross rails wherein one pair of said cross rails couples one pair of said moveable rails and the other pair of said cross rails couples the other pair of said moveable rails, each pair of said cross rails including a laterally exterior cross rail locatable adjacent to one of said sides of the vehicle and respective ends of the fixed rails and a laterally interior cross rail locatable adjacent to the center of the vehicle and fixed rails;
   locking components positioned within each exterior cross rail to retain the movable rails and cross rails in a position over the fixed rails, the locking components including a pin spring urged into a recess in at least one of the fixed rails and a handle coupled with respect thereto, the handle rotatable to engage and disengage the pin with respect to the recess; and a stop guide pin secured to each opposing end of each fixed rail with an associated engageable stop guide member secured to each interior side surface and adjacent each end of each of said movable rails for respectively receiving each of said stop guide pins whereby when a movable rail is moved to said loading position away from the center of the roof, each of said stop guide member will respectively receive each of said stop guide pins to allow the pivoting down of the movable rails and cross rails for coupling and uncoupling articles thereto.

2. A pull down roof rack comprising:

a pair of parallel fixed rails adapted to be secured to a roof of a vehicle, the fixed rails including a front fixed rail and a rear fixed rail, the rails adapted to extend from side to side of the vehicle, each of the fixed rails being a slot formed in an upper surface of the rails with rollers rotatable therein wherein the upper peripheral surfaces of the rollers extend above the upper surface of the rails, each rail having sides, opposing exterior ends adapted to extend over the sides of the vehicle and laterally extending projections on each side thereof constituting bearing surfaces;

two pair of movable rails wherein one pair of said moveable rails are slidably supported to respective fixed rails on one side of said vehicle and the other pair of said moveable rails are slidably supported to respective fixed rails on the other side of said vehicle, said moveable rails overlying the fixed rails and movable in pairs between a storage position wherein the movable rails are totally overlying the fixed rails and a loading position wherein the movable rails are slid outwardly and then pivoted downwardly from the center of the roof, each movable rail having an upper surface, downwardly extending interior and exterior side surfaces connected to said side surfaces and inwardly extending bearing surfaces located above and below the lateral projections of the fixed rails; and two pair of cross rails wherein one pair of said cross rails couples one pair of said moveable rails and the other pair of said cross rails couples the other pair of said moveable rails, each pair of said cross rails including a laterally exterior cross rail and a laterally interior cross rail; and a cylindrical stop guide pin secured to each exterior end of each fixed rail with an engageable U-shaped stop guide member secured to each interior side surface and adjacent each end of each movable rail for respectively receiving each of said stop guide pins whereby when the movable rails are moved to said loading position away from the center of the roof, each of the stop guide members will respectively receive each of the stop guide pins to allow the pivoting down of the movable rails and cross rails.

3. The roof rack as set forth in claim 2 and further including locking components positioned within each exterior cross rail to retain the removable rails and cross rails in a position over the fixed rails, the locking components including a pin spring urged into a recess formed in at least one of the fixed rails and a handle coupled with respect thereto, the handle rotatable to engage and disengage the pin with respect to the recess.

4. The roof rack as set forth in claim 2 and further comprising electrical resistance components located in at least one of the fixed rails to raise the temperature thereof and an electrical cord operatively connected to the resistance components having a plug positionable in the cigarette lighter of the vehicle for energizing the resistance components to therefor raise the temperature of the rails.

* * * * *